US012563180B2

(12) United States Patent (10) Patent No.: US 12,563,180 B2
Chujoh et al. (45) Date of Patent: Feb. 24, 2026

(54) VIDEO CODING APPARATUS AND DECODING APPARATUS

(71) Applicant: Sharp Kabushiki Kaisha, Sakai City (JP)

(72) Inventors: Takeshi Chujoh, Sakai City (JP); Tomoko Aono, Sakai City (JP); Tomohiro Ikai, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/629,014

(22) Filed: Apr. 8, 2024

(65) Prior Publication Data

US 2024/0348771 A1 Oct. 17, 2024

(30) Foreign Application Priority Data

Apr. 12, 2023 (JP) ................................. 2023-064778

(51) Int. Cl.
H04N 19/105 (2014.01)
H04N 19/172 (2014.01)
H04N 19/46 (2014.01)

(52) U.S. Cl.
CPC ......... H04N 19/105 (2014.11); H04N 19/172 (2014.11); H04N 19/46 (2014.11)

(58) Field of Classification Search
CPC .. H04N 19/105; H04N 19/172; H04N 19/176; H04N 19/46; H04N 19/577; H04N 19/70
See application file for complete search history.

(56) References Cited

U.S. PATENT DOCUMENTS

| | | | |
|---|---|---|---|
| 2022/0038720 A1* | 2/2022 | Hashimoto .......... | H04N 19/174 |
| 2022/0295091 A1* | 9/2022 | Chujoh ................ | H04N 19/186 |
| 2022/0400278 A1* | 12/2022 | Wang ................... | H04N 19/188 |
| 2023/0082043 A1* | 3/2023 | Hendry ................ | H04N 19/70 375/240.15 |
| 2023/0114860 A1* | 4/2023 | Zhang ................. | H04N 19/105 375/240.26 |

FOREIGN PATENT DOCUMENTS

WO WO-2021202371 A1 * 10/2021 ............. H04N 19/70

OTHER PUBLICATIONS

International Telecommunication Union, "Series H: Audiovisual and Multimedia Systems Infrastructure of audiovisual services—Coding of moving video", ITU-T H.266, Apr. 2022, 534 pages.

* cited by examiner

*Primary Examiner* — Anner Holder
(74) *Attorney, Agent, or Firm* — Keating & Bennett, LLP

(57) ABSTRACT

The number of weights of a reference list from coded data is decoded. The number of the weights of the reference list is set equal to or more than 1. A flag indicating whether a weight coefficient and an offset value are present is decoded for each index of the reference list, according to the number of the weights. The weight coefficient and the offset value are decoded in a case that a value of the flag is true. An interpolation image of a reference picture is multiplied by the weight coefficient, the offset value is added, and a prediction image is generated.

2 Claims, 11 Drawing Sheets

(a)

| seq_parameter_set_rbsp( ) { | Descriptor |
|---|---|
|    sps_decoding_parameter_set_id | ue(4) |
|    sps_video_parameter_set_id | ue(4) |
|    ... | |
|    sps_weighted_pred_flag | u(1) |
|    sps_weighted_bipred_flag | u(1) |
|    ... | |
|    long_term_ref_pics_flag | u(1) |
|    inter_layer_ref_pics_present_flag | u(1) |
|    sps_idr_rpl_present_flag | u(1) |
|    rpl1_same_as_rpl0_flag | u(1) |
|    for( i = 0; i < rpl1_same_as_rpl0_flag ? 1 : 2; i++ ) { | |
|      num_ref_pic_lists_in_sps[ i ] | ue(v) |
|      for( j = 0; j < num_ref_pic_lists_in_sps[ i ]; j++) | |
|       ref_pic_list_struct( i, j ) | |
|      } | |
|    ... | |
| } | |

(b)

| pic_parameter_set_rbsp( ) { | Descriptor |
|---|---|
|    ... | |
|    pps_no_pic_partition_flag | u(1) |
| | |
|    for( i = 0; i < 2; i++ ) | |
|      pps_num_ref_idx_default_active_minus1[ i ] | ue(v) |
|    ... | |
|    pps_weighted_pred_flag | u(1) |
|    pps_weighted_bipred_flag | u(1) |
|    ... | |
|    if( !pps_no_pic_partition_flag ) { | |
|      pps_rpl_info_in_ph_flag | u(1) |
|    ... | |
|      if( ( pps_weighted_pred_flag \|\| pps_weighted_bipred_flag ) &&            pps_rpl_info_in_ph_flag ) | |
|       pps_wp_info_in_ph_flag | u(1) |
| | |
|      } | |
|    ... | |
| } | |

FIG. 8

| picture_header_structure( ) { | Descriptor |
|---|---|
| ... | |
| ph_inter_slice_allowed_flag | u(1) |
| ... | |
| if( pps_rpl_info_in_ph_flag ) | |
| ref_pic_lists( ) | |
| ... | |
| if( ph_inter_slice_allowed_flag ) { | |
| ... | |
| if( ( pps_weighted_pred_flag \|\| pps_weighted_bipred_flag ) && pps_wp_info_in_ph_flag ) | |
| pred_weight_table( ) | |
| } | |
| ... | |
| } | |

FIG. 9

| slice_header( ) { | Descriptor |
|---|---|
| ... | |
| if( !pps_rpl_info_in_ph_flag  &&  ( ( nal_unit_type  != IDR_W_RADL  &&<br>    nal_unit_type  != IDR_N_LP )  \|\|  sps_idr_rpl_present_flag ) ) | |
|   ref_pic_lists( ) | |
| if( ( sh_slice_type  != I  &&  num_ref_entries[ 0 ][ RplsIdx[ 0 ] ] > 1 )  \|\|<br>    ( sh_slice_type  == B  &&  num_ref_entries[ 1 ][ RplsIdx[ 1 ] ] > 1 ) ) { | |
|   sh_num_ref_idx_active_override_flag | u(1) |
|   if( sh_num_ref_idx_active_override_flag ) | |
|     for( i = 0; i < ( sh_slice_type  == B ? 2: 1 ); i++ ) | |
|       if( num_ref_entries[ i ][ RplsIdx[ i ] ] > 1 ) | |
|         sh_num_ref_idx_active_minus1[ i ] | ue(v) |
|   } | |
| if( sh_slice_type  != I ) { | |
|   ... | |
|   if( !pps_wp_info_in_ph_flag  &&<br>    ( ( pps_weighted_pred_flag  &&  sh_slice_type  == P )  \|\|<br>    ( pps_weighted_bipred_flag  &&  sh_slice_type  == B ) ) ) | |
|     pred_weight_table( ) | |
|   } | |
|   ... | |
| } | |

FIG. 10

| pred_weight_table( ) { | Descriptor |
|---|---|
| luma_log2_weight_denom | ue(v) |
| if( ChromaArrayType != 0 ) | |
| delta_chroma_log2_weight_denom | se(v) |
| if( pps_wp_info_in_ph_flag ) | |
| num_l0_weights | ue(v) |
| for( i = 0; i < NumWeightsL0; i++ ) | |
| luma_weight_l0_flag[ i ] | u(1) |
| if( ChromaArrayType != 0 ) | |
| for( i = 0; i < NumWeightsL0; i++ ) | |
| chroma_weight_l0_flag[ i ] | u(1) |
| for( i = 0; i < NumWeightsL0; i++ ) { | |
| if( luma_weight_l0_flag[ i ] ) { | |
| delta_luma_weight_l0[ i ] | se(v) |
| luma_offset_l0[ i ] | se(v) |
| } | |
| if( chroma_weight_l0_flag[ i ] ) | |
| for( j = 0; j < 2; j++ ) { | |
| delta_chroma_weight_l0[ i ][ j ] | se(v) |
| delta_chroma_offset_l0[ i ][ j ] | se(v) |
| } | |
| } | |
| if( pps_weighted_bipred_flag && pps_wp_info_in_ph_flag && num_ref_entries[ 1 ][ RplsIdx[ 1 ] ] > 0 ) | |
| num_l1_weights | ue(v) |
| for( i = 0; i < NumWeightsL1; i++ ) | |
| luma_weight_l1_flag[ i ] | u(1) |
| if( ChromaArrayType != 0 ) | |
| for( i = 0; i < NumWeightsL1; i++ ) | |
| chroma_weight_l1_flag[ i ] | u(1) |
| for( i = 0; i < NumWeightsL1; i++ ) { | |
| if( luma_weight_l1_flag[ i ] ) { | |
| delta_luma_weight_l1[ i ] | se(v) |
| luma_offset_l1[ i ] | se(v) |
| } | |
| if( chroma_weight_l1_flag[ i ] ) | |
| for( j = 0; j < 2; j++ ) { | |
| delta_chroma_weight_l1[ i ][ j ] | se(v) |
| delta_chroma_offset_l1[ i ][ j ] | se(v) |
| } | |
| } | |
| } | |

FIG. 11

VIDEO CODING APPARATUS AND DECODING APPARATUS

RELATED APPLICATIONS

This application claims the benefit of Japanese Patent Application No. 2023-064778, filed on Apr. 12, 2023, which is hereby incorporated by reference in its entirety.

TECHNICAL FIELD

Embodiments of the present invention relate to a video coding apparatus and a video decoding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and an H.265/High-Efficiency Video Coding (HEVC) scheme, and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, the recent technology for video coding and decoding includes NPL 1.

In NPL 1, in management of reference picture lists, a system of defining multiple reference picture lists and referring to and using them is adopted. In weighted prediction, a method of explicitly defining the number of weights is adopted.

CITATION LIST

Non Patent Literature

NPL 1:
Recommendation ITU-T H.266 (04/22) "Versatile Video Coding"

SUMMARY OF INVENTION

Technical Problem

However, in NPL 1, there is a problem that, in specifications, although 0 can be defined as the number of weights in weighted prediction, operation cannot be performed in a case that the number of weights is 0.

Solution to Problem

A video decoding apparatus according to an aspect of the present invention includes a weighted prediction processing unit configured to decode the number of weights of a reference list from coded data, set the number of the weights of the reference list equal to or more than 1, decode a flag indicating whether a weight coefficient and an offset value are present for each index of the reference list, according to the number of the weights, decode the weight coefficient and the offset value in a case that a value of the flag is true, and multiply an interpolation image of a reference picture by the weight coefficient and add the offset value to generate a prediction image.

A video coding apparatus according to an aspect of the present invention includes a weighted prediction processing unit configured to code the number of weights of a reference list, set the number of the weights of the reference list equal to or more than 1, code a flag indicating whether a weight coefficient and an offset value are present for each index of the reference list, according to the number of the weights, code the weight coefficient and the offset value in a case that a value of the flag is true, and multiply an interpolation image of a reference picture by the weight coefficient and add the offset value to generate a prediction image.

By employing such a configuration, the above problem can be solved.

Advantageous Effects of Invention

According to an aspect of the present invention, the problem described above can be solved.

BRIEF DESCRIPTION OF DRAWINGS

FIG. 8 is a diagram illustrating a part of syntax of a Sequence Parameter Set (SPS) and a Picture Parameter Set (PPS).

FIG. 9 is a diagram illustrating a part of syntax of a picture header PH.

FIG. 10 is a diagram illustrating a part of syntax of a slice header.

FIG. 11 is a diagram illustrating syntax of weighted prediction information pred_weight_table.

DESCRIPTION OF EMBODIMENTS

First Embodiment

Embodiments of the present invention will be described below with reference to the drawings.

Figure 1:
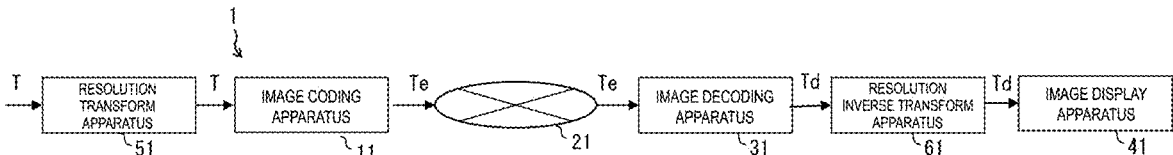
FIG. 1 is a schematic diagram illustrating a configuration of an image transmission system according to an embodiment of the present invention.

FIG. 1 is a schematic diagram illustrating a configuration of an image transmission system 1 according to the present embodiment.

The image transmission system 1 is a system that transmits a coding stream in which an image of a different resolution obtained by converting resolution is coded, decodes the coding stream transmitted, inversely converts the resolution of the image to the original resolution, and displays the image. The image transmission system 1 includes a resolution conversion apparatus (resolution conversion unit) 51, a video coding apparatus (image coding apparatus) 11, a network 21, a video decoding apparatus (image decoding apparatus) 31, a resolution inverse conversion apparatus (resolution inverse conversion processing unit) 61, and a video display apparatus (image display apparatus) 41.

The resolution conversion apparatus 51 converts the resolution of an image T included in a video, and supplies a variable resolution video signal including the image with a different resolution to the image coding apparatus 11. The resolution conversion apparatus 51 supplies, to the video coding apparatus 11, information indicating the presence or absence of resolution conversion of the image. In a case that the information indicates resolution conversion, the video coding apparatus sets the resolution conversion information ref_pic_resampling_enabled_flag described below equal to 1, and includes the information in a sequence parameter set SPS (Sequence Parameter Set) of coded data for coding.

The image T with the converted resolution is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily a bidirectional communication network and may be a unidirectional communication network that transmits broadcast waves for terrestrial digital broadcasting, satellite broadcasting, or the like. The network 21 may be substituted by a storage medium in which the coding stream Te is recorded, such as a Digital Versatile Disc (DVD) (trade name) or a Blue-ray Disc (BD) (trade name).

The video decoding apparatus 31 decodes each of the coding streams Te transmitted by the network 21 and generates and supplies a variable resolution decoded image signal to the resolution inverse conversion apparatus 61.

In a case that the resolution conversion information included in the variable resolution decoded image signal indicates resolution conversion, the resolution inverse conversion apparatus 61 generates a decoded image signal with the original size by inversely converting the resolution of the image with the converted resolution.

The video display apparatus 41 displays all or part of one or multiple decoded images Td indicated by the decoded image signal received from the resolution inverse conversion processing unit. For example, the video display apparatus 41 includes a display device such as a liquid crystal display and an organic Electro-luminescence (EL) display. Examples of display types include stationary, mobile, and HMD. In a case that the video decoding apparatus 31 has a high processing capability, an image having high image quality is displayed, and in a case that the apparatus has a lower processing capability, an image which does not require high processing capability and display capability is displayed.

Operators

Operators used herein will be described below.

">>" is a right bit shift, "<<" is a left bit shift, "&" is a bitwise AND, "|" is a bitwise OR, "|=" is an OR assignment operator, and "|" indicates a logical sum.

x? y: z is a ternary operator that takes y in a case that x is true (other than 0) and takes z in a case that x is false (0).

Clip3(a, b, c) is a function to clip c in a value of a to b, and a function to return a in a case that c is smaller than a (c<a), return b in a case that c is greater than b(c>b), and return c in the other cases (provided that a is smaller than or equal to b (a<=b)).

abs (a) is a function that returns the absolute value of a.

Int (a) is a function that returns the integer value of a.

Floor (a) is a function that returns the maximum integer equal to or less than a.

ceil (a) is a function that returns the minimum integer equal to or greater than a.

Max (a, b) is a function that returns the larger value between a and b.

Min (a, b) is a function that returns the smaller value between a and b.

a/d represents division of a by d (round down decimal places).

a÷d and a divided by d represent division of a by d (not rounded down).

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described with reference to FIG. 2 and FIG. 3.

Figure 2:
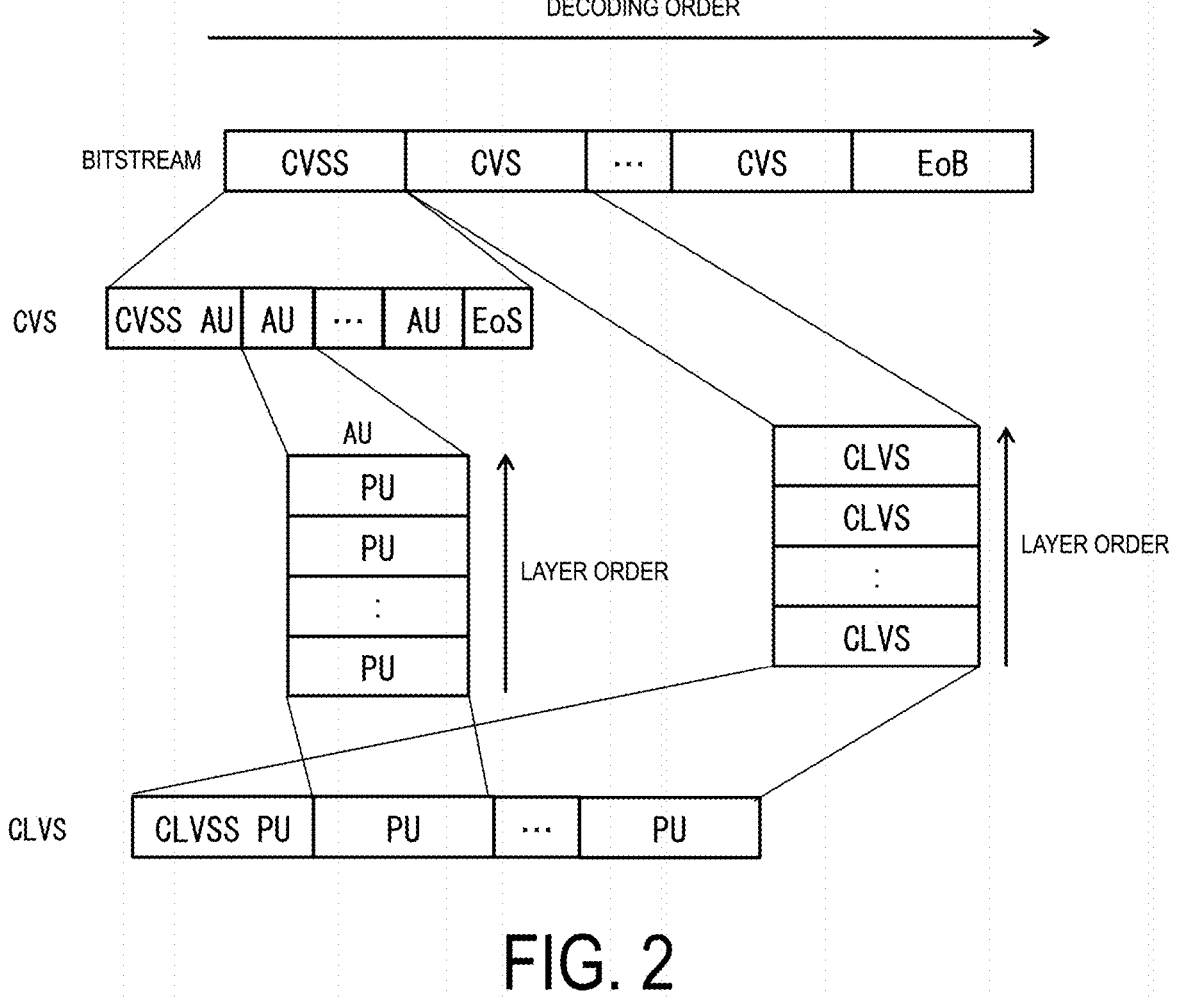
FIG. 2 is a diagram illustrating a hierarchical structure of coded data.

The coded data Te is a bitstream including multiple Coded Video Sequences (CVSs) and an End of Bitstream (EoB) NAL unit illustrated in FIG. 2. The CVS includes multiple Access Units (AUs) and an End of Sequence (EoS) NAL unit. The AU at the start of the CVS is referred to as a Coded Video Sequence Start (CVSS) AU. A unit obtained by splitting the CVS for each layer is referred to as a Coded Layer Video Sequence (CLVS). The AU includes Picture Units (PUs) of one or multiple layers at the same output time. In a case that a Multilayer coding scheme is not adopted, the AU includes one PU. The PU is a unit of coded data of one decoded picture including multiple NAL units. The CLVS includes PUs of the same layer, and the PU at the start of the CLVS is referred to as a Coded Layer Video Sequence Start (CLVSS) PU. The CLVSS PU is limited to the PU including randomly accessible Intra Random Access Pictures (IRAP) or Gradual Decoder Refresh Picture (GDR). The NAL unit includes a NAL unit header and Raw Byte Sequence Payload (RBSP) data. The NAL unit header includes, subsequently to 0 data of 2 bits, nuh_layer_id of 6 bits indicating a layer value, nuh_unit_type of 5 bits indicating a NAL unit type, and nuh_temporal_id_plus1 of 3 bits of a value obtained by adding 1 to a Temporal ID value.

Figure 3:
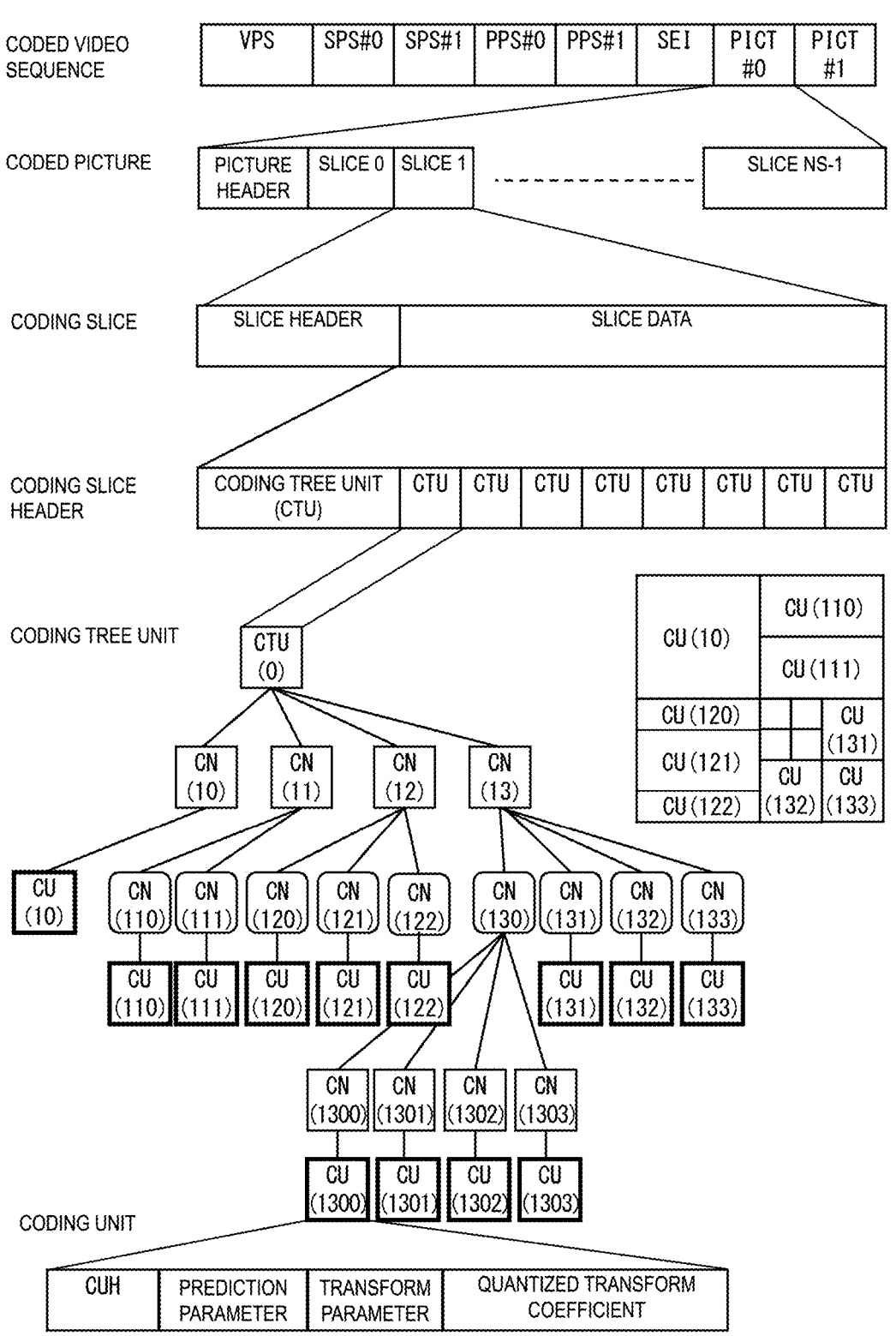
FIG. 3 is a diagram illustrating a hierarchical structure of coded data in units of PU.

FIG. 3 is a diagram illustrating a hierarchical structure of data in the coded data Te in units of PU. The coded data Te includes a sequence and multiple pictures constituting the sequence illustratively. FIG. 3 is a diagram illustrating a coded video sequence defining a sequence SEQ, a coded picture prescribing a picture PICT, a coding slice prescribing a slice S, a coding slice data prescribing slice data, a coding tree unit included in the coding slice data, and a coding unit included in the coding tree unit.

In the coded video sequence, a set of data referred to by the image decoding apparatus 31 to decode the sequence SEQ to be processed is defined. As illustrated in FIG. 3, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

Here, the sequence parameter set SPS includes the following syntax elements.

pic_width_max_in_luma_samples: A syntax element indicating, in units of luminance blocks, the width of one of the images in a single sequence, the image having the largest width. The syntax element has a value that is not 0 and that is an integer multiple of Max (8, MinCbSize Y). Here, MinCbSizeY is a value determined by the minimum size of the luminance block.

pic_height_max_in_luma_samples: A syntax element indicating, in units of luminance blocks, the height of one of the images in a single sequence, the image having the largest height. The syntax element has a value that is not 0 and that is an integer multiple of Max (8, MinCbSizeY).

In the picture parameter set PPS, a set of coding parameters referred to by the image decoding apparatus 31 to decode each picture in a target sequence is defined. Note that multiple PPSs may exist. In that case, any of the multiple PPSs is selected from each picture in a target sequence.

Here, the picture parameter set PPS includes the following syntax elements.

pps_pic_width_in_luma_samples: A syntax element indicating the width of a target picture. The syntax element is required to have a value that is not 0 and that is an integer multiple of Max (8, MinCbSizeY) and that is equal to or less than sps_pic_width_max_in_luma_samples. InpPicWidthInLumaSamples to be described later is set equal to pps_pic_width_in_luma_samples.

pps_pic_height_in_luma_samples: A syntax element indicating the height of the target picture. The syntax element is required to have a value that is not 0 and that is an integer multiple of Max (8, MinCbSize Y) and that is equal to or less than sps_pic_height_max_in_luma_samples. InpPicHeightInLumaSamples to be described later is set equal to pps_pic_height_in_luma_samples.

pps_conformance_window_flag: A flag indicating whether a conformance (cropping) window offset parameter is subsequently signaled, the flag indicating a location where a conformance window is displayed. In a case that the flag is 1, the parameter is signaled, and in a case that the flag is 0, then no conformance window offset parameter is present.

sps_chroma_format_id is a parameter indicating a chrominance format. ChromaFormatIdc to be described later is set equal to sps_chroma_format_id.

pps_init_qp_minus26 is information for deriving a quantization parameter SliceQpY of a slice referred to in the PPS.

Coded Picture

In the coded picture, a set of data referred to by the image decoding apparatus 31 to decode the picture PICT to be processed is defined. As illustrated in FIG. 3, the picture PICT includes a picture header PH and slices 0 to NS−1 (NS is the total number of slices included in the picture PICT).

Coding Slice

In the coding slice, a set of data referred to by the image decoding apparatus 31 to decode the slice S to be processed is defined. As illustrated in FIG. 3, the slice includes a slice header and slice data.

The slice header includes a coding parameter group referenced by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slices for which only an intra prediction is used in coding, (2) P slices for which a uni-prediction (L0 prediction) or an intra prediction is used in coding, and (3) B slices for which a uni-prediction (L0 prediction or L1 prediction), a bi-prediction, or an intra prediction is used in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the image decoding apparatus 31 to decode the slice data to be processed is defined. The slice data includes CTUs as illustrated in the coding slice header in FIG. 3. The CTU is a block of a fixed size (for example, 64×64) constituting a slice, and may also be called a Largest Coding Unit (LCU).

Coding Tree Unit

In FIG. 3, a set of data is defined that is referenced by the image decoding apparatus 31 to decode the CTU to be processed. The CTU is split into coding units CUs, each of which is a basic unit of coding processing, by a recursive Quad Tree split (QT split), Binary Tree split (BT split), or Ternary Tree split (TT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

In FIG. 3, a set of data referenced by the image decoding apparatus 31 to decode the coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

Note that, in a case that the present specification mentions "a flag indicating whether or not XX", a flag being other than 0 (for example, 1) assumes a case of XX, and a flag being 0 assumes a case of not XX, and 1 is treated as true and 0 is treated as false in a logical negation, a logical product, and the like (hereinafter, the same is applied). However, other values can be used for true values and false values in real apparatuses and methods.

Configuration of Image Decoding Apparatus

Figure 4:
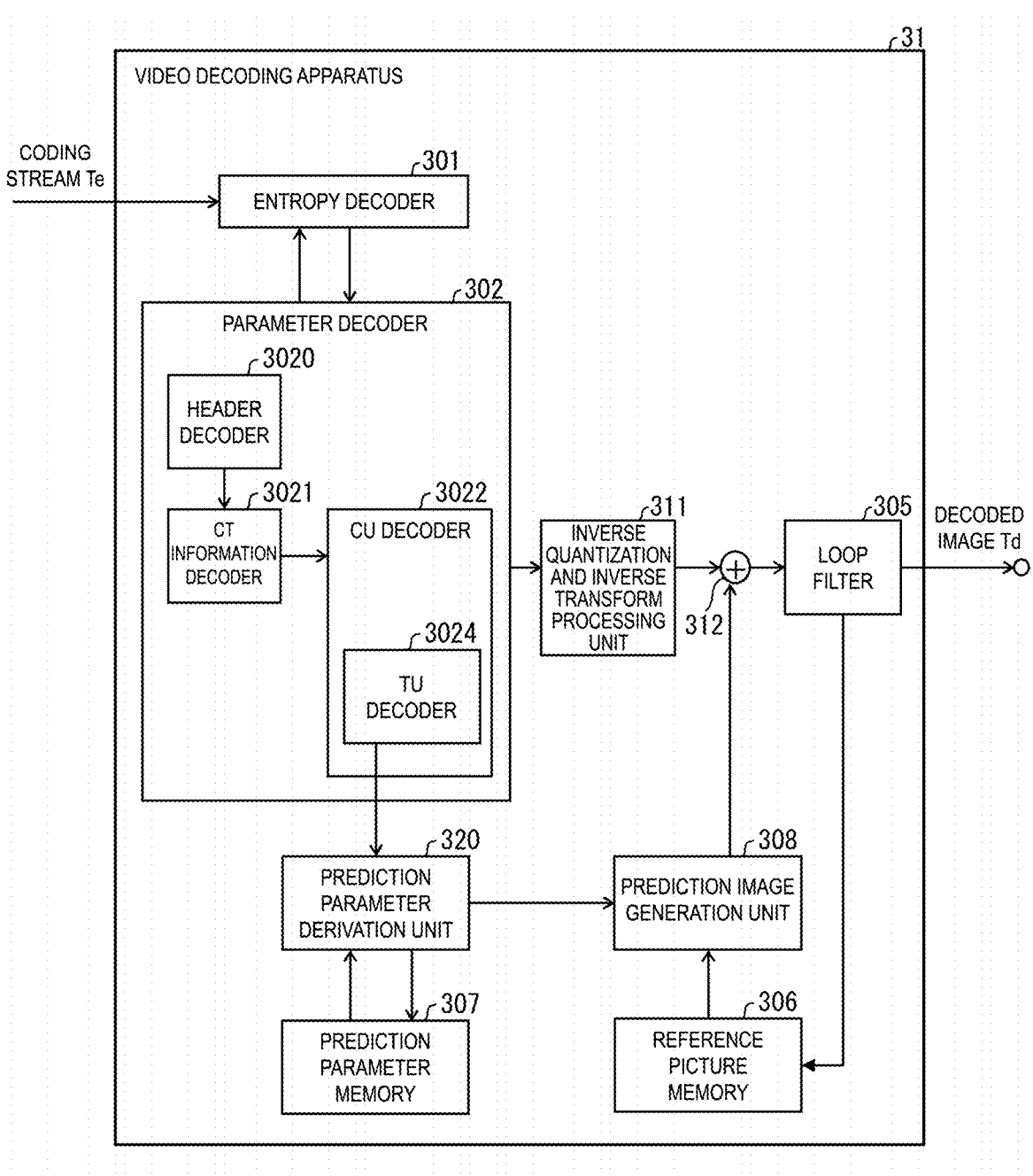
FIG. 4 is a schematic diagram illustrating a configuration of an image decoding apparatus.

The configuration of the image decoding apparatus 31 (FIG. 4) according to the present embodiment will be described.

The image decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used in accordance with the image coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. The TU decoder 3024 decodes QP update information (quantization correction value) and quantization prediction error (residual_coding) from coded data.

The prediction image generation unit 308 includes an inter prediction image generation unit 309 and an intra prediction image generation unit 310.

The entropy decoder 301 performs entropy decoding on the coded data Te input from the outside and separates and decodes individual codes (syntax elements).

The entropy decoder 301 outputs the decoded codes to the parameter decoder 302. Which code is to be decoded is controlled based on an indication of the parameter decoder 302.

Basic Flow

Figure 5:
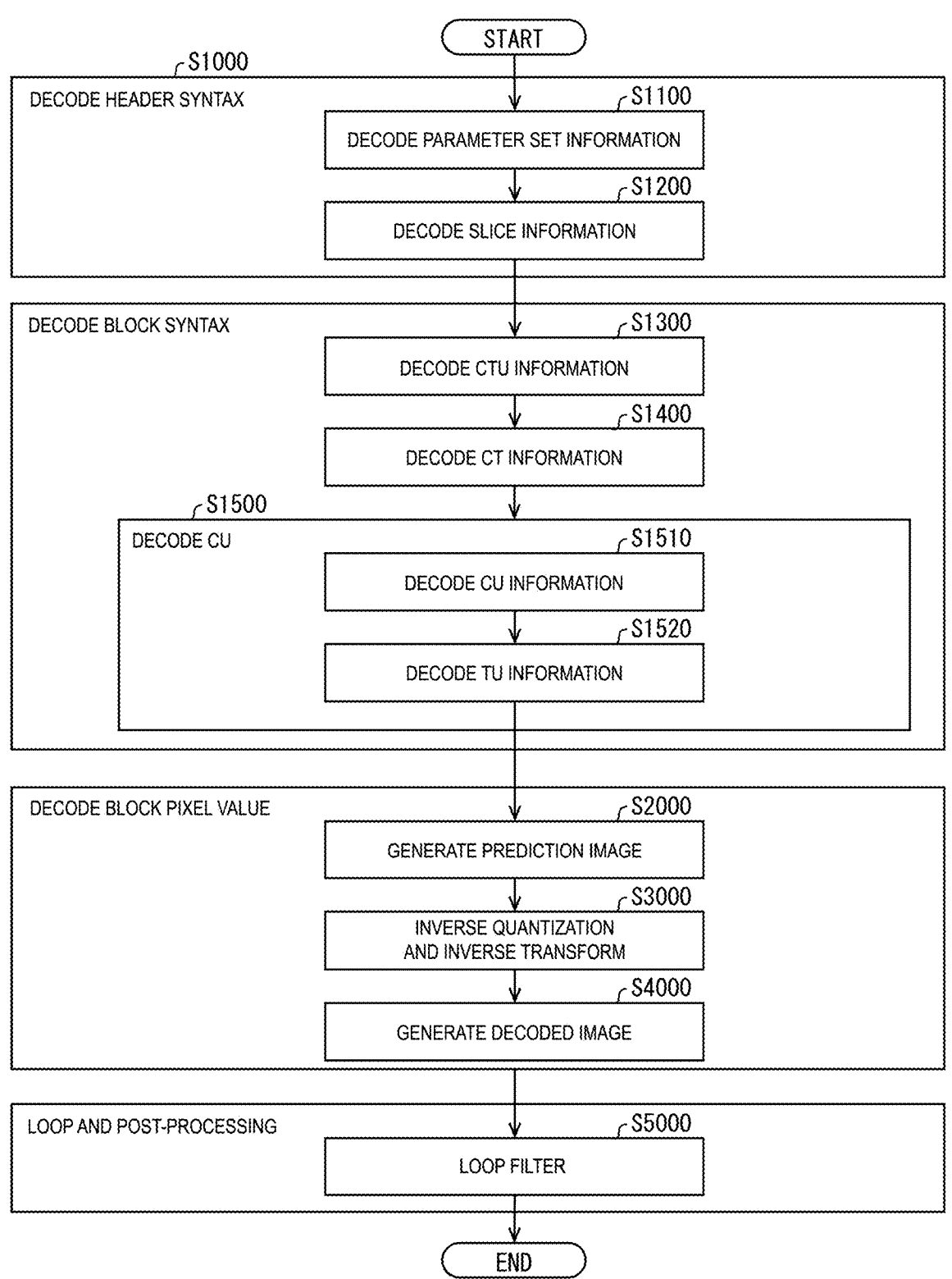
FIG. 5 is a flowchart illustrating general operation of the image decoding apparatus.

FIG. 5 is a flowchart illustrating general operation of the image decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, and the like from the coded data.

(S1520: Decoding of TU information) The TU decoder 3024 decodes QP update information, a quantization prediction error, and the like from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Inter Prediction Image Generation Unit

Figure 6:
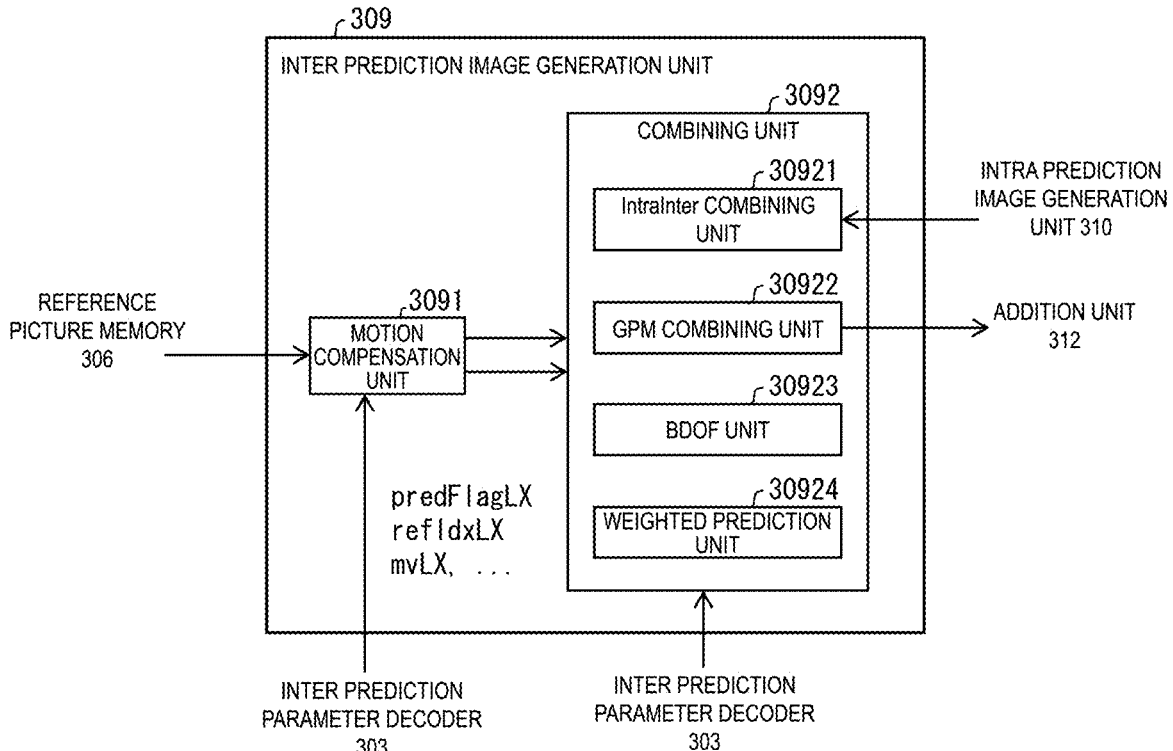
FIG. 6 is a schematic diagram illustrating a configuration of an inter prediction image generation unit.

FIG. 6 is a schematic diagram illustrating a configuration of the inter prediction image generation unit 309 included in the prediction image generation unit 308 according to the present embodiment. The prediction image generation unit 308 includes an inter prediction image generation unit 309 and an intra prediction image generation unit 310. The inter prediction image generation unit 309 includes a motion compensation unit (prediction image generation apparatus) 3091 and a combining unit 3092. The combining unit 3092 includes an IntraInter combining unit 30921, a GPM combining unit 30922, a BDOF unit 30923, and a weighted prediction unit 30924.

In a case that the prediction mode indicates the inter prediction mode, the inter prediction image generation unit 309 generates a prediction image of a block or a subblock through inter prediction by using the inter prediction parameters input from the inter prediction parameter derivation unit 303 and the reference picture.

Motion Compensation

The motion compensation unit 3091 (interpolation image generation unit 3091) generates an interpolation image (motion compensation image) by reading a reference block from the reference picture memory 306 based on the inter prediction parameters input from the inter prediction parameter derivation unit 303.

The combining unit 3092 at least includes an IntraInter combining unit 30921, a GPM combining unit 30922, a BDOF unit 30923, and a weighted prediction unit 30924.

IntraInter Combining Processing

The IntraInter combining unit 30921 generates a prediction image through the weighted sum of an inter prediction image and an intra prediction image.

GPM Combining Processing

The GPM combining unit 30922 generates a prediction image using the GPM prediction described above.

BDOF Prediction

Now, the details of a Bi-Directional Optical Flow (BDOF processing, BDOF) prediction performed by the BDOF unit 30923 will be described. In a bi-prediction mode, the BDOF unit 30954 generates a prediction image with reference to two prediction images (first prediction image and second prediction image) and a gradient correction term.

Weighted Prediction

The weighted prediction unit 30924 generates a prediction image pbSamples of the block from an interpolation image predSamplesLX.

First, a variable weightedPredFlag indicating whether to perform the weighted prediction processing is derived as follows. In a case that slice_type is equal to P, weightedPredFlag is set equal to pps_weighted_pred_flag defined by the PPS. Otherwise, in a case that slice_type is equal to B, weightedPredFlag is set equal to pps_weighted_bipred_flag && (!dmvrFlag) defined by the PPS.

Hereinafter, bcw_idx is the weight index of a bi-prediction with weights in units of CU. In a case that bcw_idx is not signaled, then bcw_idx=0 is set. bcwIdx is set equal to bcwIdxN of a neighboring block in the merge prediction mode, and is set equal to bcw_idx of the target block in the AMVP prediction mode.

In a case that the value of the variable weightedPredFlag is equal to 0 or that the value of the variable bcwIdx is 0, then, as the normal prediction image processing, the prediction image pbSamples is derived as follows.

In a case that one of prediction list utilization flags (predFlagL0 or predFlagL1) is 1 (uni-prediction) (no weighted prediction is used), processing in accordance with the equation below is performed in which predSamplesLX (LX is L0 or L1) is adapted to the number of pixel bits bitDepth.

$$pbSamples[x][y]=Clip3(0,(1<<bitDepth)-1,(predSamplesLX[x][y]+offset1)>>shift1)$$

Here, shift1=14−bitDepth and offset1=1<< (shift1−1) are established. PredLX is an interpolation image of the L0 or L1 prediction.

In a case that both of prediction list utilization flags (predFlagL0 and predFlagL1) are 1 (bi-prediction PRED_BI) and that no weighted prediction is used, processing in accordance with the equation below is performed in which predSamplesL0 and predSamplesL1 are averaged and adapted to the number of pixel bits.

$$pbSamples[x][y]=Clip3(0,(1<<bitDepth)-1,(predSamplesL0[x][y]+predSamplesL1[x][y]+offset2)>>shift2)$$

Here, shift2=15−bitDepth and offset2=1<< (shift2-1) are established.

In a case that the value of the variable weightedPredFlag is equal to 1 and that the value of the variable bcwIdx is equal to 0, then, as the weighted prediction processing, the prediction image pbSamples is derived as follows.

The variable shift1 is set equal to Max (2, 14−bitDepth). The variables log2Wd, o0, o1, w0, and w1 are derived as follows.

In a case that cIdx is 0, corresponding to luminance, then the following applies.

$$log2Wd=luma\_log2\_weight\_denom+shift1$$

$$w0=LumaWeightL0[refIdxL0]$$

$$w1=LumaWeightL1[refIdxL1)]$$

$$o0=luma\_offset\_l0[refIdxL0]<<(bitDepth-8)$$

$$o1=luma\_offset\_l1[refIdxL1]<<(bitDepth-8)$$

Otherwise (cIdx is a chrominance not equal to 0), the following applies.

$$log\ 2Wd=ChromaLog\ 2WeightDenom+shift1$$

$$w0=ChromaWeightL0[refIdxL0][cIdx-1]$$

$$w1=ChromaWeightL1[refIdxL1][cIdx-1]$$

$$o0=ChromaOffsetL0[refIdxL0][cIdx-1]</(bitDepth-8)$$

$$o1=ChromaOffsetL1[refIdxL1][cIdx-1]<<(bitDepth-8)$$

The pixel value pbSamples[x][y] of the prediction image with x=0, . . . , nCbW−1 and y=0, . . . , nCbH−1 is derived as follows.

Then, in a case that predFlagL0 is equal to 1 and that predFlagL1 is equal to 0, then the pixel value pbSamples[x][y] of the prediction image is derived as follows.

$$if\ (log2Wd>=1)$$

$$pbSamples[x][y]=Clip3(0,(1<<bitDepth)-1,$$

$$((predSamplesL0[x][y]*w0+2'(log2Wd-1))>>log2Wd)+o0)$$

else $$pbSamples[x][y]=Clip3(0,(1<<bitDepth)-1,predSamplesL0[x][y]*w0+o0)$$

Otherwise, in a case that predFlagL0 is 0 and that predFlagL1 is 1, then the pixel value pbSamples[x][y] of the prediction image is derived as follows.

$$if\ (log2Wd>=1)$$

$$pbSamples[x][y]=Clip3(0,(1<<bitDepth)-1,$$

$$((predSamplesL1[x][y]*w1+2'(log2Wd-1))>>log2Wd)+o1)$$

else $$pbSamples[x][y]=Clip3(0,(1<<bitDepth)-1,predSamplesL1[x][y]*w1+o1)$$

Otherwise, in a case that predFlagL0 is equal to 1 and that predFlagL1 is equal to 1, then the pixel value pbSamples[x][y] of the prediction image is derived as follows.

$$pbSamples[x][y]=Clip3(0,(1<<bitDepth)-1,$$

$$(predSamplesL0[x][y]*w0+predSamplesL1[x][y]*w1*+((o0+o1+1)<<log2Wd)>>>(log\ 2Wd+1)))$$

Intra Prediction Image Generation Unit 310

In a case that predMode indicates an intra prediction mode, the intra prediction image generation unit 310 performs an intra prediction by using an intra prediction parameter input from the intra prediction parameter derivation unit 304 and a reference picture read out from the reference picture memory 306.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 7:
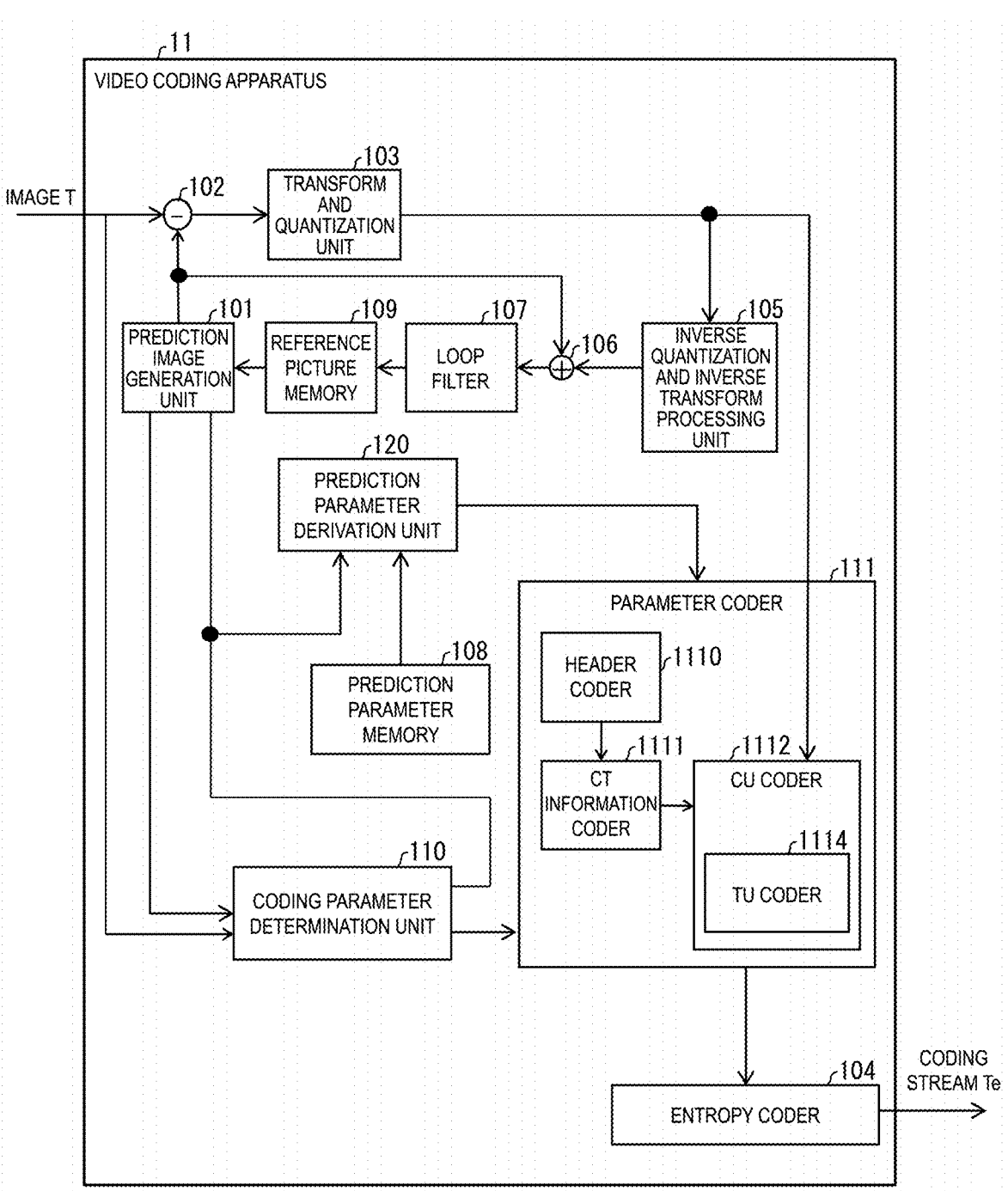
FIG. 7 is a block diagram illustrating a configuration of a video coding apparatus.

Next, a configuration of the video coding apparatus 11 according to the present embodiment will be described. FIG. 7 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit or a frame memory) 108, a reference picture memory (a reference image storage unit or a frame memory) 109, a coding parameter determination unit 110, a parameter coder 111, a prediction parameter derivation unit 120, and an entropy coder 104.

The prediction image generation unit 101 generates a prediction image for each CU. The prediction image generation unit 101 includes the inter prediction image generation unit 309 and intra prediction image generation unit 310 already described, and description of these units is omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 (FIG. 4) of the video decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supplies, to the parameter coder 111, syntax elements such as the inter prediction parameters (predMode, merge_flag, merge_idx, inter_pred_idc, refIdxLX, mvp_LX_idx, mvdLX), the intra prediction parameters (intra_luma_mpm- _flag, intra_luma_mpm_idx, intra_luma_mpm_reminder, intra_chroma_pred_mode), and the quantized transform coefficient.

The parameter coder 111 inputs the quantized transform coefficients and the coding parameters (split information and prediction parameters) to the entropy coder 104. The entropy coder 104 entropy-codes the quantized transform coefficients and the coding parameters to generate and output a coding stream Te.

The prediction parameter derivation unit 120 is a component including the inter prediction parameter coder 112 and the intra prediction parameter coder 113, and derives an intra prediction parameter and an intra prediction parameter from the parameters input from the coding parameter determination unit 110. The derived intra prediction parameter and intra prediction parameter are output to the parameter coder 111.

Configuration of Inter Prediction Parameter Coder

The inter prediction parameter coder 112 includes a parameter coding controller 1121 and an inter prediction parameter derivation unit 303. The inter prediction parameter derivation unit 303 has a configuration common to the video decoding apparatus. The parameter coding controller 1121 includes a merge index derivation unit 11211 and a vector candidate index derivation unit 11212.

The merge index derivation unit 11211 derives merge candidates and the like, and outputs the merge candidates and the like to the inter prediction parameter derivation unit 303. The vector candidate index derivation unit 11212 derives prediction vector candidates and the like, and outputs the prediction vector candidates and the like to the inter prediction parameter derivation unit 303 and the parameter coder 111.

Configuration of Intra Prediction Parameter Coder 113

The intra prediction parameter coder 113 includes a parameter coding controller 1131 and the intra prediction parameter derivation unit 304. The intra prediction parameter derivation unit 304 has a configuration common to the video decoding apparatus.

The parameter coding controller 1131 derives IntraPredMode Y and IntraPredModeC. Furthermore, with reference to mpmCandList[ ], intra_luma_mpm_flag is determined. These prediction parameters are output to the intra prediction parameter derivation unit 304 and the parameter coder 111.

However, unlike in the video decoding apparatus, the coding parameter determination unit 110 and the prediction parameter memory 108 provide input to the inter prediction parameter derivation unit 303 and the intra prediction parameter derivation unit 304, and output from the inter prediction parameter derivation unit 303 and the intra prediction parameter derivation unit 304 is provided to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The RD cost value is, for example, the sum of a code amount and the value obtained by multiplying a coefficient λ by a square error. The code amount is an amount of information of the coding stream Te obtained by performing entropy coding on a quantization error and a coding parameter. The square error is the square sum of the prediction errors calculated in the subtraction unit 102. The coefficient λ is a real number greater than a preset zero. The coding parameter determination unit 110 selects a set of coding parameters of which the calculated cost value is a minimum value. The coding parameter determination unit 110 outputs the determined coding parameters to the parameter coder 111 and the prediction parameter derivation unit 120.

Note that a computer may be used to implement some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction parameter derivation unit 320, the prediction image generation unit 101, the subtraction unit 102, the transform and quantization unit 103, the entropy coder 104, the inverse quantization and inverse transform processing unit 105, the loop filter 107, the coding parameter determination unit 110, a parameter coder 111, and the prediction parameter derivation unit 120. In that case, this configuration may be realized by recording a program for realizing such control functions on a computer-readable recording medium and causing a computer system to read and perform the program recorded on the recording medium. Further, the "computer system" described here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage apparatus such as a hard disk built into the computer system. Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a certain period of time, such as a volatile memory included in the computer system functioning as a server or a client in such a case. The above-described program may be one for implementing a part of the above-described functions, and also may be one capable of implementing the above-described functions in combination with a program already recorded in a computer system.

A part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and may be realized as dedicated circuits or a multi-purpose processor. In a case that, with advances in semiconductor technology, a circuit integration technology with which an LSI is replaced appears, an integrated circuit based on the technology may be used.

Although embodiments of the present invention have been described above in detail with reference to the drawings, the specific configurations thereof are not limited to those described above and various design changes or the like can be made without departing from the spirit of the invention.

Syntax

FIG. 8(*a*) illustrates a part of syntax of a Sequence Parameter Set (SPS) of NPL 1.

sps_weighted_pred_flag is a flag indicating whether the weighted prediction may be applied to P slices that reference the SPS. sps_weighted_pred_flag being equal to 1 indicates that the weighted prediction is applied to the P slices that reference the SPS. sps_weighted_pred_flag being equal to 0 indicates that the weighted prediction is not applied to the P slices that reference the SPS.

sps_weighted_bipred_flag is a flag indicating whether the weighted prediction may be applied to B slices that reference the SPS. sps_weighted_bipred_flag being equal to 1 indicates that the weighted prediction is applied to the B slices that reference the SPS. sps_weighted_bipred_flag being equal to 0 indicates that the weighted prediction is not applied to the B slices that reference the SPS.

long_term_ref_pics_flag is a flag indicating whether a long-term picture is used.

inter_layer_ref_pics_present_flag is a flag indicating whether inter-hierarchy prediction is used.

sps_idr_rpl_present_flag is a flag indicating whether the reference picture list is defined in the header of a slice whose nal_unit type indicates an Instantaneous Decoding Refresh picture (IDR picture).

In a case that rpl1_same_as_rpl0_flag is 1, it is indicated that the information for the reference picture list 1 is not present, and is the same as num_ref_pic_lists_in_sps[0] and ref_pic_list_struct (0, rplsIdx).

FIG. 8(*b*) illustrates a part of the syntax of the Picture Parameter Set (PPS) in NPL 1.

pps_no_pic_partition_flag is a flag indicating whether a picture is not split into tiles or slices. In a case that pps_no_pic_partition_flag is 1, it is indicated that picture split is not applied to each picture that references the PPS. In a case that pps_no_pic_partition_flag is 0, it is indicated that each picture that references the PPS may be split into multiple tiles or slices.

In a case that i is 0, pps_num_ref_idx_default_active_minus1[i]+1 indicates a value of a variable NumRefIdxActive[0] of P or B slices of a case that sh_num_ref_idx_active_override_flag is 0. The variable NumRefIdxActive[0] means the number of active reference pictures of reference list 0. A case that i is 1 indicates a value of a variable NumRefIdxActive[1] of B slices of a case that sh_num_ref_idx_active_override_flag is equal to 0. The variable NumRefIdxActive[1] means the number of active reference pictures of reference list 1. A value of pps_num_ref_idx_default_active_minus1[i] needs to be within a range of values of 0 to 14.

pps_weighted_pred_flag is a flag indicating whether the weighted prediction is applied to the P slices that reference the PPS. pps_weighted_pred_flag being equal to 0 indicates that the weighted prediction is not applied to P slices that reference the PPS. pps_weighted_pred_flag being equal to 1 indicates that the weighted prediction is applied to the P slices that reference the PPS. In a case that sps_weighted_pred_flag is equal to 0, the weighted prediction unit 3094 sets the value of pps_weighted_pred_flag equal to 0. In a case that pps_weighted_pred_flag is not present, then the value is set equal to 0.

pps_weighted_bipred_flag is a flag indicating whether the weighted prediction is applied to the B slices that reference the PPS. pps_weighted_bipred_flag being equal to 0 indicates that the weighted prediction is not applied to B slices that reference the PPS. pps_weighted_bipred_flag being equal to 1 indicates that the weighted prediction is applied to the B slices that reference the PPS. In a case that sps_weighted_bipred_flag is equal to 0, the weighted prediction unit 3094 sets the value of pps_weighted_bipred_flag equal to 0. In a case that pps_weighted_bipred_flag is not present, then the value is set equal to 0.

In a case that pps_no_pic_partition_flag is 0, the following syntax is present.

pps_rpl_info_in_ph_flag is a flag indicating whether reference picture list information is present in the picture header. pps_rpl_info_in_ph_flag being equal to 1 indicates that the reference picture list information is present in the picture header. pps_rpl_info_in_ph_flag being equal to 0 indicates that the reference picture list information is not present in the picture header, and the slice header may be present.

In a case that pps_weighted_pred_flag is equal to 1, pps_weighted_bipred_flag is equal to 1, or pps_rpl_info_in_ph_flag is equal to 1, pps_wp_info_in_ph_flag is present. pps_wp_info_in_ph_flag being equal to 1 indicates that weighted prediction information pred_weight_table is present in the picture header, and is not present in the slice header. pps_wp_info_in_ph_flag being equal to 0 indicates that the weighted prediction information pred_weight_table is not present in the picture header, and may be present in the slice header. In a case that pps_wp_info_in_ph_flag is not present, a value of pps_wp_info_in_ph_flag is equal to 0.

FIG. 9 illustrates a part of syntax of the picture header PH of NPL 1.

In a case that ph_inter_slice_allowed_flag is 0, it is indicated that slice_type of all of the slices of the picture is 2 (I Slice). In a case that ph_inter_slice_allowed_flag is 1, it is indicated that slice_type of at least one or more of slices included in the picture is 0 (B Slice) or 1 (P Slice).

In a case that pps_rpl_info_in_ph_flag is 1, ref_pic_lists( ) defining the reference picture list is called, and reference picture list is selected.

In a case that ph_inter_slice_allowed_flag is not 0, and pps_weighted_pred_flag is equal to 1 or pps_weighted_bipred_flag is equal to 1, and pps_wp_info_in_ph_flag is equal to 1, the weighted prediction information pred_weight_table is present.

FIG. 10 illustrates a part of syntax of the slice header of NPL 1. These syntaxes are decoded by the parameter decoder 302, for example.

In a case that sh_num_ref_idx_active_override_flag is 1, it is indicated that a syntax element sh_num_ref_idx_active_minus1[0] is present in the P and B slices, and a syntax element sh_num_ref_idx_active_minus1[1] is present in the B slice. In a case that num_ref_idx_active_override_flag is 0, it is indicated that the syntax element num_ref_idx_active_minus1[0] is not present in the P and B slices. In the case of not being present, it is inferred that a value of num_ref_idx_active_override_flag is equal to 1.

sh_num_ref_idx_active_minus1[i] is used to derive the number of reference pictures actually used for a reference picture list i. A derivation method of the variable NumRefIdxActive[i] being the number of reference pictures actually used will be described later. The value of sh_num_ref_idx_active_minus1[i] needs to be a value of 0 to 14. In a case that the slice is the B slice, and num_ref_idx_active_override_flag is 1, and num_ref_idx_active_minus1[i] is not present, it is inferred that num_ref_idx_active_minus1[i] is equal to 0.

In a case that pps_wp_info_in_ph_flag is not 1, and pps_weighted_pred_flag is equal to 1 and slice_type is 1 (P Slice), or pps_weighted_bipred_flag is equal to 1 and slice_type is 0 (B Slice), pred_weight_table is called.

The following pseudocode illustrates a derivation method of the variable NumRefIdxActive[i] of NPL 1 by the prediction parameter derivation unit 320. Regarding the reference picture list i (=0, 1), in a case of the B slice or the P slice and the reference picture list 0, in a case that sh_num_ref_idx_active_override_flag is equal to 1, a value obtained by adding 1 to the value of sh_num_ref_idx_active_minus1[i] is set to the variable NumRefIdxActive[i]. Otherwise (in a case of the B slice or the P slice and the reference picture list 0, and that sh_num_ref_idx_active_override_flag is equal to 0), in a case that the value of num_ref_entries[i][RplsIdx[i]] is equal to or greater than a value obtained by adding 1 to pps_num_ref_idx_default_active_minus1[i], the variable NumRefIdxActive[i] is set equal to the value obtained by adding 1 to pps_num_ref_idx_default_active_minus1[i]. Otherwise, the variable NumRefIdxActive[i] is set equal to the value of num_ref_entries[i][RplsIdx[i]]. pps_num_ref_idx_default_active_minus1[i] is a value of a default variable NumRefIdxActive[i] defined in the PPS. In a case of the I slice, or a case of the P slice and the reference picture list 1, the variable NumRefIdxActive[i] is set equal to 0.

```
for(i=0: 1<2: i++) {
    if(sh_slice_type == B || (sh_slice_type == P && i == 0)) {
        if(sh_num_ref_idx_active_override_flag)
            NumRefIdxActive[i] = sh_num_ref_idx_active_minus1[i] + 1
        else {
            if(num_ref_entries[i][RpIsIdx[i]]
                >= pps_num_ref_idx_default_active_minus1[i]+1)
                NumRefIdxActive[i] =
                pps_num_ref_idx_default_active_minus1[i] + 1
            else
                NumRefIdxActive[i] = num_ref_entries[i][RpIsIdx[i]]
        }
    } else /* sh_slice_type == I || (sh_slice_type == P && i == 1) */
        NumRefIdxActive[i] = 0
}
```

A value of NumRefIdxActive[i]−1 indicates a maximum reference index value of the reference list that can be used in decoding of a slice. In a case that the value of NumRefIdxActive[i] is 0, the reference index cannot be used. Thus, in a case that the current slice is the P slice, the value of NumRefIdxActive[0] needs to be larger than 0. In a case that the current slice is the B slice, both of NumRefIdxActive[0] and NumRefIdxActive[1] need to be larger than 0.

FIG. 11 illustrates syntax of the weighted prediction information pred_weight_table of NPL 1.

luma_log2_weight_denom is base 2 logarithm for the denominators of all luminance weight coefficients. The value of luma_log2_weight_denom need to be in a range from 0 to 7. delta_chroma_log2_weight_denom is a difference in base 2 logarithm for the denominators of all chrominance weight coefficients. In a case that delta_chroma_log2_weight_denom is absent, delta_chroma_log2_weight_denom is inferred to be equal to 0. The variable ChromaLog2WeightDenom is derived to be equal to luma_log2_weight_denom+delta_chroma_log2_weight_denom, and the value needs to be in a range from 0 to 7.

In a case that pps_wp_info_in_ph_flag is equal to 1, num_l0_weights indicates the number of weights signaled to entries of the reference picture list 0. A value of num_l0_weights is in the range of 0 to Min (15, num_ref_entries[0] [RplsIdx [0]]). In a case that pps_wp_info_in_ph_flag is equal to 1, a variable NumWeightsL0 is set equal to num_l0_weights. Otherwise (pps_wp_info_in_ph_flag is equal to 0), the variable NumWeightsL0 is set equal to NumRefIdxActive[0]. Here, num_ref_entries [i][RplsIdx[i]] indicates the number of reference pictures of the reference picture list i. The variable RplsIdx [i] is an index value indicating multiple lists present of the reference picture list i.

luma_weight_l0_flag[i] is a flag indicating that there is a weight coefficient of a luminance component of an i-th L0 prediction of the reference picture list 0. luma_weight_l0_flag[i] being 1 indicates that a weight coefficient of the luma component for the L0 prediction is present. luma_weight_l0_flag[i] being 0 indicates that a weight coefficient of the luma component for the L0 prediction is absent. In a case that the luma_weight_l0_flag[i] is absent, the weighted prediction unit 3094 infers that luma_weight_l0_flag[i] is equal to 0. chroma_weight_l0_flag[i] is a flag indicating that there is a weight coefficient of a chrominance prediction value of an i-th L0 prediction of the reference picture list 0. chroma_weight_l0_flag[i] being 1 indicates that a weight coefficient of the chrominance prediction value for the L0 prediction is present. chroma_weight_l0_flag[i] being 0 indicates that a weight coefficient of the chrominance prediction value for the L0 prediction is absent. In a case that chroma_weight_l0_flag[i] is absent, then the weighted prediction unit 3094 infers that chroma_weight_l0_flag[i] is equal to 0.

delta_luma_weight_l0 [i] is a difference in weight coefficient applied to the luminance prediction value of the i-th L0 prediction of the reference picture list 0. The variable LumaWeightL0[i] is derived to be equal to (1<<luma_log2_weight_denom)+delta_luma_weight_l0 [i]. In a case that luma_weight_l0_flag[i] is equal to 1, the value of delta_luma_weight_l0 [i] needs to be in a range from −128 to 127. In a case that luma_weight_l0_flag[i] is equal to 0, then the weighted prediction unit 3094 infers that LumaWeightL0 [i] is equal to the value of 2 to the luma_log2_weight_denom-th power (2^luma_log2_weight_denom).

Luma_offset_l0[i] is an offset value applied to a luminance prediction value of an i-th L0 prediction of the reference picture list 0. The value of Luma_offset_l0[i] needs to be in a range from −128 to 127. In a case that luma_weight_l0_flag[i] is equal to 0, then the weighted prediction unit 3094 infers that luma_offset_l0[i] is equal to 0.

delta_chroma_weight_l0 [i][j] is a difference in weight coefficient applied to the chrominance prediction value of the i-th L0 prediction of the reference picture list for L0 with j of 0 for Cb and j of 1 for Cr. The variable ChromaWeightL0 [i][j] is derived to be equal to (1<<ChromaLog2WeightDenom)+delta_chroma_weight_l0 [i][j]. In a case that chroma_weight_l0_flag[i] is equal to 1, the value of delta_chroma_weight_l0 [i][j] needs to be in a range from −128 to 127. In a case that chroma_weight_l0_flag[i] is 0, then the weighted prediction unit 3094 infers that ChromaWeightL0[i][j] is equal to the value of 2 to the ChromaLog2WeightDenom-th power (2^ChromaLog2WeightDenom). delta_chroma_offset_l0[i] [j] is a difference in an offset value applied to the chrominance prediction value of the i-th L0 prediction of the reference picture list for L0 with j of 0 for Cb and j of 1 for Cr. The variable ChromaOffsetL0 [i][j] is derived as follows.

$$ChromaOffsetL0[i][j] = Clip3\ (-128,\ 127,$$
$$(128 + delta\_chroma\_offset\_l0[i][j] -$$
$$(\ (128 * ChromaWeightL0[i][j]) >> ChromaLog2WeightDenom)\ )\ )$$

The value of delta_chroma_offset_l0[i][j] needs to be in a range from −4*128 to 4*127. In a case that chroma_weight_l0_flag[i] is equal to 0, the weighted prediction unit 3094 infers that ChromaOffsetL0 [i][j] is equal to 0.

In a case that pps_weighted_bipred_flag and pps_wp_info_in_ph_flag are both equal to 1, num_l1_weights indicates the number of weights signaled to entries of the reference picture list 1. A value of num_l1_weights is in the range of 0 to Min (15, num_ref_entries[1] [RplsIdx [1]]).

A variable NumWeightsL1 is derived using the following pseudocode. In a case that pps_weighted_bipred_flag is not 1, or pps_wp_info_in_ph_flag is 1 and a value of num_ref_entries[1] [RplsIdx [1]] is 0, a value of the variable NumWeightsL1 is set equal to 0. Otherwise, that is, in a case that pps_wp_info_in_ph_flag is 1, the value of the variable NumWeightsL1 is set equal to a value of the syntax element num_l1_weights. In neither of the cases, the variable num_l1_weights is set equal to a value of the variable NumRefIdxActive[1]. pps_weighted_bipred_flag not being 1 means that the weighted prediction is not applied to the B slices. pps_wp_info_in_ph_flag is a flag indicating whether the weighted prediction information pred_weight_table is present in the picture header. num_ref_entries is a parameter indicating the number of reference pictures of the reference picture list 1.

```
if (!pps_weighted_bipred_flag ||
    (pps_wp_info_in_ph_flag && num_ref_entries[1][RolsId[1]] = =
    0) )
        NumWeightsL1 = 0
else if (pps_wp_info_in_ph_flag)
        NumWeightsL1 = num_l1_weights
else
        NumWeighteL1 = NumRefIdxActive[1]
```

Note that luma_weight_l1_flag[i], chroma_weight_l1_flag[i], delta_luma_weight_l1 [i], luma_offset_l1[i], delta_chroma_weight_l1 [i][j], and delta_chroma_offset_l1 [i][j] are respectively interpreted as luma_weight_l0_flag[i], chroma_weight_l0_flag[i], delta_luma_weight_l0 [i], luma_offset_l0[i], delta_chroma_weight_l0 [i][j], and delta_chroma_offset_l0[i][j], and that l0, L0, list0, and List0 are respectively interpreted as 11, 11, list1, and List1.

In NPL 1, regarding the value of the variable NumRefIdxActive[0], the following restriction is present.

In a case that one of the following conditions is true, the value of NumRefIdxActive[0] needs to be equal to or less than the value of NumWeightsL0.

A case that the value of pps_wp_info_in_ph_flag is 1, pps_weighted_pred_flag is 1, and sh_slice_type is P.

A case that the value of pps_wp_info_in_ph_flag is 1, pps_weighted_bipred_flag is 1, and sh_slice_type is B.

Regarding the value of the variable NumRefIdxActive[1], in a case that pps_wp_info_in_ph_flag is 1, pps_weighted_bipred_flag is 1, and sh_slice_type is B, the value of NumRefIdxActive[1] needs to be equal to or less than the value of NumWeightsL1.

In NPL 1, in a case that one of the following conditions is true, regarding each value of i within a range from 0 to NumRefIdxActive[0]-1, it is inferred that the values of luma_weight_l0_flag[i] and chroma_weight_l0_flag[i] are both equal to 0.

A case that the value of pps_wp_info_in_ph_flag is 1, pps_weighted_pred_flag is 0, and sh_slice_type is P.

A case that the value of pps_wp_info_in_ph_flag is 1, pps_weighted_bipred_flag is 0, and sh_slice_type is B.

In NPL 1, the number of weights can be explicitly indicated by syntax in the weighted prediction as described above. However, there is a problem that, although 0 can be indicated as the number of weights, coding and decoding cannot be performed in a case that 0 is indicated.

Specifically, first, for the reference list 0, the value of the syntax element num_l0_weights is in a range of 0 to Min(15, num_ref_entries[0][RplsIdx[0]]). Thus, the value may be 0. Next, in a case that pps_wp_info_in_ph_flag is equal to 1, that is, the syntax element num_l0_weights is coded and decoded, the value of the variable NumWeightsL0 is set equal to num_l0_weights.

In a case that the value of pps_wp_info_in_ph_flag is 1, pps_weighted_pred_flag is 1, and sh_slice_type is P, or the value of pps_wp_info_in_ph_flag is 1, pps_weighted_bipred_flag is 1, and sh_slice_type is B, there is a condition that the value of the variable NumRefIdxActive[0] needs to be equal to or less than the value of NumWeightsL0.

In a case that the value of pps_wp_info_in_ph_flag is 1, pps_weighted_pred_flag is 1, and sh_slice_type is P, or the value of pps_wp_info_in_ph_flag is 1, pps_weighted_bipred_flag is 1, and sh_slice_type is B, the syntax element num_l0_weights is coded and decoded. In a case that the value of num_l0_weights is 0, the value of the variable NumWeightsL0 is 0, and the value of the variable NumRefIdxActive[0] also needs to be 0.

However, in a case of the P slice, the value of NumRefIdxActive[0] needs to be larger than 0. In a case of the B slice, both of NumRefIdxActive[0] and NumRefIdxActive[1] need to be larger than 0. In other words, in a case that the value of NumRefIdxActive[0] is 0, the reference picture of the reference list 0 is not present, and thus coding and decoding cannot be performed. Thus, in a case that num_l0_weights is explicitly indicated to 0, the variable NumWeightsL0 is invariably 0 and NumRefIdxActive[0] is also 0, and it can thus be understood that coding and decoding cannot be performed.

In view of this, in the present embodiment, as a first solution, a range of the value of the syntax element num_l0_weights is changed, and the value of the syntax element num_l0_weights is set in a range of 1 to Min(15, num_ref_entries[0] [RplsIdx [0]]).

In another embodiment, as a second solution, a method of setting the variable NumWeightsL0 is changed. In a case that pps_wp_info_in_ph_flag is equal to 1, the variable NumWeightsL0 is set equal to Max (1, num_l0_weights). Otherwise (pps_wp_info_in_ph_flag is equal to 0), the variable NumWeightsL0 is set equal to NumRefIdxActive[0].

In another embodiment, as a third solution, the condition that the value of the variable NumRefIdxActive[0] needs to be equal to or less than the value of NumWeightsL0 is changed as follows.

In a case that one of the following conditions is true, the value of NumRefIdxActive[0] needs to be equal to or less than the value of Max (1, NumWeightsL0).

A case that the value of pps_wp_info_in_ph_flag is 1, pps_weighted_pred_flag is 1, and sh_slice_type is P, and A case that the value of pps_wp_info_in_ph_flag is 1, pps_weighted_bipred_flag is 1, and sh_slice_type is B.

A similar problem is present for the reference list 1 as well. The value of the syntax element num_l1_weights is in a range of 0 to Min(15, num_ref_entries[1] [RplsIdx [1]]). Thus, the value may be 0. Next, in a case that pps_weighted_bipred_flag is not 1, or pps_wp_info_in_ph_flag is 1 and num_ref_entries[1] [RplsIdx [1]] is 0, the variable NumWeightsL1 is set equal to 0. In other words, in a case of the B slice and not the weighted prediction of the bidirectional prediction, or that the number of reference pictures of the reference list 1 is 0 (case of the P slice) although the weighted prediction information pred_weight_table is present in the picture header, the variable NumWeightsL1 is set equal to 0. Note that, under this condition, the syntax element num_l1_weights is not coded and decoded. In a case of a condition other than the above condition and that pps_wp_info_in_ph_flag is equal to 1, the value of the variable NumWeightsL1 is set equal to num_l1_weights. In other words, in a case that the syntax element num_l1_weights is coded and decoded, the value of the variable NumWeightsL1 is set equal to num_l1_weights. In a case of a condition other than any of the above conditions, the variable NumWeightsL1 is set equal to the value of the variable NumRefIdxActive[1].

In a case that pps_wp_info_in_ph_flag is 1, pps_weighted_bipred_flag is 1, and sh_slice_type is B, there is a condition that the value of the variable NumRefIdxActive[1] needs to be equal to or less than the value of NumWeightsL1.

In a case that the value of pps_wp_info_in_ph_flag is 1, pps_weighted_bipred_flag is 1, and sh_slice_type is B, the syntax element num_l1_weights is coded and decoded. Thus, in a case that the value of num_l1_weights is 0, the value of the variable NumWeightsL1 is 0, and the value of the variable NumRefIdxActive[1] also needs to be 0.

However, in a case of the B slice, both of NumRefIdxActive[0] and NumRefIdxActive[1] need to be larger than 0. In other words, in a case that the value of NumRefIdxActive[1] is 0, the reference picture of the reference list 1 is not present, and thus coding and decoding cannot be performed. Thus, in a case that num_l1_weights is explicitly indicated to 0, the variable NumWeightsL1 is invariably 0, and NumRefIdxActive[1] is also 0, and it can thus be understood that coding and decoding cannot be performed.

In view of this, in the present embodiment, as a fourth solution, a range of the value of the syntax element num_l1_weights is changed, and the value of the syntax element num_l1_weights is set in a range of 1 to Min(15, num_ref_entries[1] [RplsIdx [1]]).

In another embodiment, as a fifth solution, a method of setting the variable NumWeightsL1 is changed as in the following pseudocode.

```
if(!pps_weighted_bipred_flag | |
    (pps_wp_info_in_ph_flag && num_ref_entries[1][RplsIdx[1]]==
    0))
        NumWeightsL1 = 0
else if (pps_wp_info_in_ph flag)
        NumWeightsL1 = Max (1, num_l1_weights)
else
        NumWeightsL1 = NumRef IdxActive[1]
```

In a case that the syntax element num_l1_weights is coded and decoded, the variable NumWeightsL1 is set equal to Max (1, num_l1_weights).

In another embodiment, as a sixth solution, the condition that the value of the variable NumRefIdxActive[1] needs to be equal to or less than the value of NumWeightsL1 is changed as follows.

Regarding the value of the variable NumRefIdxActive[1], in a case that pps_wp_info_in_ph_flag is 1, pps_weighted_bipred_flag is 1, and sh_slice_type is B, the value of NumRefIdxActive[1] needs to be equal to or less than the value of Max (1, NumWeightsL1).

Employing such a configuration can solve the problem that, although 0 can be indicated as the number of weights, coding and decoding cannot be performed in a case that 0 is indicated in the weighted prediction.

Application Example

The above-mentioned video coding apparatus 11 and the video decoding apparatus 31 can be utilized being installed to various apparatuses performing transmission, reception, recording, and reconstruction of videos. Note that the video may be a natural video imaged by a camera or the like, or may be an artificial video (including CG and GUI) generated by a computer or the like.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

Embodiments of the present invention are not limited to those described above and various changes can be made within the scope indicated by the claims. That is, embodiments obtained by combining technical means appropriately modified within the scope indicated by the claims are also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

31 Image decoding apparatus
301 Entropy decoder
302 Parameter decoder
303 Inter prediction parameter derivation unit
304 Intra prediction parameter derivation unit
305, 107 Loop filter
306, 109 Reference picture memory
307, 108 Prediction parameter memory
308, 101 Prediction image generation unit
309 Inter prediction image generation unit
310 Intra prediction image generation unit
311, 105 Inverse quantization and inverse transform processing unit
312, 106 Addition unit
320 Prediction parameter derivation unit
3091 Motion compensation unit
3092 Combining unit
30921 IntraInter combining unit
30922 GPM combining unit
30923 BDOF unit
30924 Weighted prediction unit
11 Image coding apparatus
102 Subtraction unit
103 Transform and quantization unit
104 Entropy coder
110 Coding parameter determination unit
111 Parameter coder
112 Inter prediction parameter coder
113 Intra prediction parameter coder
120 Prediction parameter derivation unit

The invention claimed is:

1. A video decoding apparatus, comprising:
a weighted prediction processing unit configured to
decode a number of reference pictures of a reference picture list and a number of weights of the reference picture list from coded data,
set the number of the weights of the reference picture list equal to a value in a range of greater than or equal to 1 and less than or equal to an upper value, wherein the upper value is a minimum value of 15 and the number of the reference pictures of the reference picture list,
decode a flag indicating whether a weight coefficient and an offset value are present for each index of the reference picture list, according to the number of the weights,
decode the weight coefficient and the offset value in a case that a value of the flag is true, and
use an interpolation image of a reference picture, the weight coefficient, and the offset value to generate a prediction image.

2. A video coding apparatus, comprising:
a weighted prediction processing unit configured to
code a number of reference pictures of a reference picture list and a number of weights of the reference picture list,
set the number of the weights of the reference picture list equal to a value in a range of greater than or equal to 1 and less than or equal to an upper value, wherein the upper value is a minimum value of 15 and the number of the reference pictures of the reference picture list,
code a flag indicating whether a weight coefficient and an offset value are present for each index of the reference picture list, according to the number of the weights,
code the weight coefficient and the offset value in a case that a value of the flag is true, and use an interpolation image of a reference picture, the weight coefficient, and the offset value to generate a prediction image.

* * * * *